United States Patent [19]

Oakes et al.

[11] Patent Number: 5,025,975
[45] Date of Patent: Jun. 25, 1991

[54] COMPOSITE TUBULAR PRODUCTS

[75] Inventors: Graham Oakes; Terrence Marrison; Martin Bridge, all of Sheffield, England

[73] Assignee: Special Melted Products Limited, Yorkshire, England

[21] Appl. No.: 454,304

[22] Filed: Dec. 21, 1989

[51] Int. Cl.$^5$ .................................. B23K 20/22
[52] U.S. Cl. .................... 228/127; 228/243; 228/193
[58] Field of Search .............. 228/126, 127, 131, 133, 228/161, 190, 193, 237, 243

[56] References Cited

U.S. PATENT DOCUMENTS

| 2,267,665 | 12/1941 | Raydt et al. | 228/127 |
| 2,371,348 | 3/1945 | Murray | 228/127 |
| 2,947,078 | 8/1960 | Pflumm et al. | 228/243 |
| 3,481,024 | 12/1969 | Bunn | 228/127 |
| 3,762,032 | 10/1973 | Bowling et al. | 228/243 |

FOREIGN PATENT DOCUMENTS

| 2517839 | 11/1975 | Fed. Rep. of Germany | 228/127 |
| 23392 | 3/1981 | Japan | 228/243 |
| 195591 | 12/1982 | Japan | 228/127 |
| 159284 | 9/1984 | Japan | 228/133 |
| 1539082 | 1/1979 | United Kingdom . | |
| 1580857 | 12/1980 | United Kingdom . | |

Primary Examiner—Sam Heinrich
Attorney, Agent, or Firm—Kinney & Lange

[57] ABSTRACT

A method of making a composite tubular product which comprises inner and outer tubes of different chemical compositions and in which the stresses produced at the interface between the outer and inner tubes during cooling from a diffusion bonding temperature are such that the interface between the two tubes remains intact during such cooling. The method comprises the step of inserting into the interior of the inner tube a core of a material whose transformation and/or contraction characteristics are sufficient to counteract at least to a substantial amount interfacial stresses which arise during cooling because of differences in the transformation and contraction properties of different materials from which the inner and outer tubes of the composite product are formed.

6 Claims, 2 Drawing Sheets

COMPOSITE TUBULAR PRODUCTS

FIELD OF THE INVENTION

This invention relates to composite tubular products and methods of making such products.

Composite tubes comprising physically bonded inner and outer steel tubes of different chemical compositions have found applications in a number of industries. They are used, for example, where the environmental conditions present on the outside and inside of the tube cannot be met by a single material.

DESCRIPTION OF THE PRIOR ART

Several methods of producing such tubes have been tried successfully, including forging, extrusion, codrawing, diffusion bonding and, explosion forming. Problems have been experienced, however, in maintaining a sound defect free interface between the materials of the outer and inner tubular components of the product, particularly in cases where the inner material exhibits a significantly higher rate of thermal contraction than the outer and does not undergo similar transformations.

United Kingdom Patent 1539082 discloses a method of manufacturing polymetallic pipe from at least two individual pipe billets of different metallic compositions. The individual pipes are positioned one coaxially within the other, heated and placed in a die. A fluid medium is introduced into the pipe interior and a fluid pressure is created sufficient to diffusion weld the adjoining surfaces of the coaxial pipes. United Kingdom Patent 1580857 is directed to a similar method of manufacturing polymetallic pipe except that the fluid medium comprises a melt of, for example, a salt solution heated to a temperature of around 820° C.

The methods described in these two publications are quite distinct from the method of the present invention in which a solid core is inserted into the interior of the inner of two coaxial tubes to be diffusion bonded, the solid core being produced from a material whose transformation and/or contraction characteristics are sufficient to counteract interfacial stresses which arise during cooling of the coaxial tubes from the required diffusion bonding temperature.

SUMMARY OF THE INVENTION

The present invention sets out to provide a method of producing composite tubes which utilises thermal contraction and transformation characteristics partially to offset tensile stresses produced at the interface of a diffusion bonded composite tube during cooling thereby to avoid, or at least reduce, the likelihood of interface separation.

According to the present invention in one aspect, there is provided a method of making a composite tubular product which comprises inner and outer tubes of different chemical compositions and in which the stresses produced at the interface between the outer and inner tubes during cooling from a diffusion bonding temperature are such that the interface between the two tubes remains intact during such cooling, the method comprising the step of inserting into the interior of the inner tube a core of a material whose transformation and/or contraction characteristics are sufficient to counteract at least to a substantial amount interfacial stresses which arise during cooling because of differences in the transformation and contraction properties of different materials from which the inner and outer tubes of the composite product are formed.

According to the present invention in another aspect, there is provided a method of producing a diffusion bonded composite tubular product in which the composition of the interior of the product differs from that of its exterior, the method comprising the steps of inserting into the interior of a composite tubular product a core whose transformation and/or contraction characteristics are such that stresses at the interface between the interior and exterior of the tubular product which arise during cooling of the composite product from its diffusion bonding temperature are resisted and counteracted by the presence of the core.

According to the present invention in a still further aspect, there is provided a method of diffusion bonding coaxial tubes of different composition to form a composite tubular product wherein, during cooling of the coaxial tubes from the required diffusion bonding temperature, a controlled internal pressure is applied to the interior of the coaxial tubes to oppose and counteract contraction of the inner tube.

It has been demonstrated that methods in accordance with the invention successfully avoid rupturing occurring at the interface of a diffusion bonded coaxial tube comprising an inner material of a nickel based super alloy (Nimonic 90) and an outer material of 3.5% Ni Cr MoV.

BRIEF DESCRIPTION OF THE DRAWINGS

The invention will now be described, by way of example only, with reference to the accompanying diagrammatic drawings in which.

DESCRIPTION OF A PREFERRED EMBODIMENT OF THE INVENTION

Attempts were made to produce by a conventional route not in accordance with the invention, a diffusion bonded composite product comprising an outer tube of Ni, Cr, Mo V steel of composition by weight:

0.35 C, 0.25 Si, 0.50 Mn, 1.8 Cr, 0.6 Ni, 3.5 Mo, 0.15 V, Balance Fe;

and an inner tube of nickel based alloy of composition:

0.08 C, 19.5 Cr, 15.6 Co, 2.45 Ti, 1.35 Al, Balance Ni.

This product failed due to rupturing at the interface between the inner and outer tubes during cooling from the high temperatures for diffusion bonding. Examination of the ruptured bond revealed that the materials had seemingly bonded satisfactorily during the high temperature/high pressure cycle employed for diffusion bonding but that the bond had ruptured during cooling from this high temperature.

The reason for failure of the bond during cooling was attributed to the bond strength being incapable of withstanding the transformation and contractional stress experienced when two dissimilar materials are cooled in unison. The origin of these stresses/strains can be demonstrated by examination of the transformation and thermal contraction characteristics of the two materials in question exemplified graphically in FIG. 1.

Figure 1:
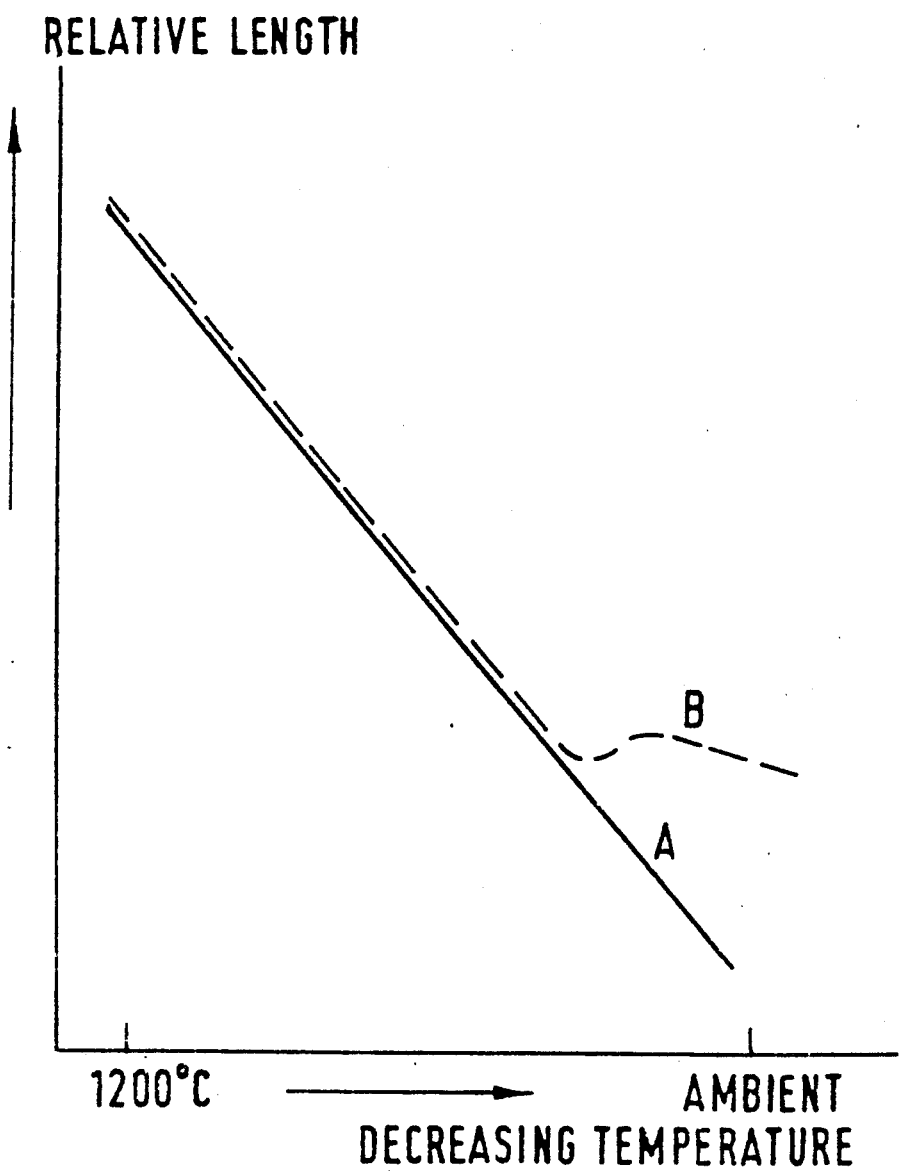
FIG. 1 graphically illustrates the stresses occasioned at the interface between a diffusion bonded composite tubular member during cooling from the appropriate diffusion bonding temperature when employing a method not in accordance with the present invention.

Thus, FIG. 1 shows that at a diffusion bonding temperature of approximately 1200° C. both materials had an austenitic (face centered cubic) structure. During the initial cooling period (1200° C. to 300° C.), therefore, both materials exhibited similar but not identical coefficients of expansion/contraction as shown by solid line A; thus little or no stress/strain was imposed on the interface. In addition, at these high temperatures, diffusion or creep was possible and any slight stress/strain resulting from differences in the respective coefficients of expansion were readily accommodated by diffusional creep processes.

Further reduction in temperature resulted in the relaxation process slowing considerably. As indicated by broken graph line B, when the temperature fell below 300° C. in the outer alloy steel tube, it underwent a phase change from face centered cubic to body centerd cubic. The same phase change was not experienced by the inner tube (see full graph line A of FIG. 1). The phase change was accompanied by an overall expansion of approximately 3% and resulted in the interface becoming subjected to high stresses/strains. Further cooling after the outer tube had transformed resulted in a further increase in stress at the interface due to the significantly lower rate of thermal contraction exhibited by the steel alloy in its body centerd cubic state.

Attempts to accomodate these stresses/strains by the introduction of a ductile nickel or stainless steel layer between the two dissimilar metals was found to be only partially successful, minor rupturing of the interface being still apparent.

The present invention was conceived to overcome the problems outlined above. In making the invention it was appreciated that in view of the large strain to be accommodated, i.e. 3% transformation plus additional contractional strains, a satisfactory bond could be achieved by opposing the contraction of the inner lining by applying to it a controlled internal pressure.

In accordance with the invention, a controlled internal pressure is applied to the interior of the inner tube by means of a core inserted into the interior of the pre-bonded composite product. Simply to stop shrinkage of the inner tube, a material with little or no thermal shrinkage would be required (e.g. Invar alloy or certain refactories), or materials which matched the shrinkage of the outer tube rather than the inner tube.

Where the outer tube is produced from an alloy steel, an added complication arises from the existence of a 3% linear expansion during cooling arising from the structual change from face centered cubic (FCC) to body centered cubic (BCC). The situation for an alloy steel inner tube liner with an austenitic alloy (nimonic 90) is shown in FIG. 1.

In all cases the principle for choosing a core material is the same. First, an estimate is made of the stresses likely to occur at the interface between the inner and outer tubes, then calculate the core pressure needed to overcome these estimated stresses. An appropriate material is then selected to generate the core stresses occasioned by differential shrinkage.

Figure 2:
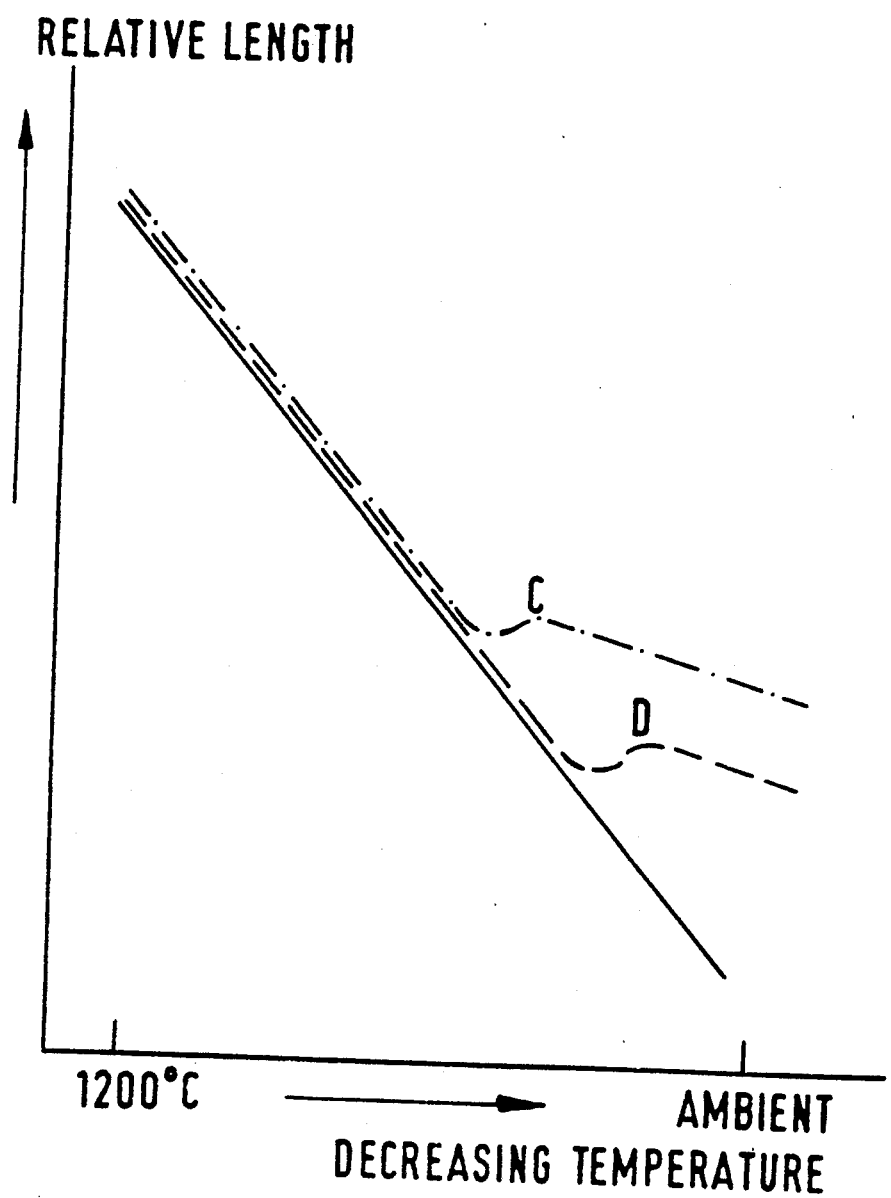
FIG. 2 graphically illustrates the stresses occasioned at the interface between a diffusion bonded composition tubular member during cooling from the appropriate diffusion bonding temperature when employing a method in accordance with the present invention.

An alternative technique is illustrated in FIG. 2. Here a core material with similar transformation characteristics to the outer tube has been selected. However, because of the temperature gradient between the center and surface of the composite during cooling, the core needs to transform at a higher temperature than the outer tube. The exact temperature difference between the two transformations depends on the temperature gradient during cooling and the thickness of the inner tube liner. In any event, the temperature difference between the two transformations is preferably not less than 50° C. and not greater than 350° C.

This is demonstrated graphically in FIG. 2 of the drawings where broken graph line C shows the phase change from face centered cubic to body centerd cubic of the core and broken graph line D shows the phase change from face centerd cubic to body centerd cubic of the outer tube. Table 1 below illustrates the properties and transformation characteristics of the alloys shown in FIG. 2.

TABLE 1

| | | Cooling Characteristics |
|---|---|---|
| Outer Tube | Alloy Steel (EN40C Type) | 1100–300° $\alpha = 18 \times 10^{-6}$ |
| | | 300–200° C. 3% Linear Expansion |
| | | 200–20° C. $\alpha = 12 \times 10^{-6}$ |
| Inner Tube Liner | Nimonic 90 Type | 1100–20° C. $\alpha = 18 \times 10^{-6}$ |
| Core | Mild Steel | 1100–550° C. $\alpha = 18 \times 10^{-6}$ |
| | | 550–450° C. 3% Linear Expansion |
| | | 450–20° C. $\alpha = 12 \times 10^{-6}$ |

Using the above method a satisfactory bond between the outer alloy steel and inner nickel base alloy has been achieved. Typical of other materials which could form the outer or inner tubes and make use of this invention are set out in Table 2 below.

TABLE 2

| TYPICAL OUTER TUBE | INNER TUBE |
|---|---|
| Alloysteels ⎤ | ⎡ Nickel Alloys |
| Cast Irons ⎬ | ⎢ Austenitic |
| Plain Carbon Steels ⎦ | ⎣ Stainless Steels |
| Silver-Copper ⎤ | Brass |
| Cupronickel ⎦ | |
| Titanium ⎤ | ⎡ Aluminium |
| Tungsten ⎦ | ⎣ Steels |
| (Outer Tube is generally of a material having low shrinkage properties) | (Inner Tube is generally of a material having relatively high shrinkage properties) |

Forging of the assembled tubes and core is typically effected using a rotary forging machine, for example a four hammer machine. After forging, the core may simply be bored out to leave a barrel containing a lining of, for example, Nimonic 90. This lining is typically of the order of 3 mm thickness.

It will be appreciated that the foregoing is merely exemplary of methods in accordance with the invention and that modification can be made thereto without departing from the true scope of the invention.

We claim:

1. A method of producing a composite tubular product comprising an inner tube of a first chemical composition fusion bonded within an outer tube of a second chemical composition different to that of the first, the method comprising:

locating the inner tube within the outer tube;

locating within the assembly of the inner and outer tubes a solid core of a material having a structure which transforms from face centered cubic to body centered cubic at a transformation temperature which approximates to a transformation temperature at which a structure of the outer tube is transformed from face centered cubic to body centered cubic following fusion bonding of the assembly of the tubes and the core;

heating the assembly of the tubes and core while under pressure to a temperature at which diffusion bonding of the core to the inner tube and the inner tube to the outer tube takes place;

cooling the assembly of the tubes and the core;

forging the fusion bonded assembly of the tubes and core to produce an elongate tubular product; and removing the core from the elongate forged product by a boring process.

2. A method as claimed in claim 1 wherein the transformation temperature of the core material from face centered cubic to body centered cubic is no less than 50° C. below and no more than 350° C. above the transformation temperature of the outer tube material from face centered cubic to body centered cubic.

3. A method as claimed in claim 1 wherein the core comprises a nickel based alloy.

4. A method as claimed in claim 1 wherein the core has a composition by weight percent of 0.08 carbon, 19.5 chrome, 15.6 cobalt, 2.45 titanium, 1.35 aluminum, balance nickel excepting incidental impurities.

5. A method as claimed in claim 1 wherein the outer tube comprises an alloy steel.

6. A method as claimed in claim 1 wherein the core is produced from mild steel.

* * * * *